United States Patent
Brown et al.

(10) Patent No.: US 8,443,158 B2
(45) Date of Patent: May 14, 2013

(54) MOBILE WIRELESS COMMUNICATIONS DEVICE PROVIDING DATA MANAGEMENT AND SECURITY FEATURES AND RELATED METHODS

(75) Inventors: Travis Brown, Henrietta, NY (US); David March, Rochester, NY (US); Lloyd Palum, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1486 days.

(21) Appl. No.: 11/257,731

(22) Filed: Oct. 25, 2005

(65) Prior Publication Data
US 2007/0094463 A1    Apr. 26, 2007

(51) Int. Cl.
*G06F 12/00* (2006.01)
*G06F 13/00* (2006.01)

(52) U.S. Cl.
USPC .......................... 711/159; 711/133; 711/163

(58) Field of Classification Search .................. None
See application file for complete search history.

(56) References Cited

U.S. PATENT DOCUMENTS

| | | | |
|---|---|---|---|
| 5,357,612 A | 10/1994 | Alaiwan | 395/200 |
| 5,625,795 A | 4/1997 | Sakakura et al. | 395/475 |
| 5,652,885 A * | 7/1997 | Reed et al. | 713/1 |
| 6,112,286 A * | 8/2000 | Schimmel et al. | 711/208 |
| 6,879,518 B1 | 4/2005 | Curry | 365/185.04 |
| 6,898,721 B2 * | 5/2005 | Schmidt | 713/322 |
| 7,152,231 B1 * | 12/2006 | Galluscio et al. | 719/312 |
| 2003/0097596 A1 | 5/2003 | Muratov et al. | |
| 2004/0243745 A1 * | 12/2004 | Bolt et al. | 710/68 |
| 2005/0041510 A1 | 2/2005 | Khawand et al. | 365/230.03 |

\* cited by examiner

*Primary Examiner* — Kaushikkumar Patel
(74) *Attorney, Agent, or Firm* — Allen, Dyer, Doppelt, Milbrath & Gilchrist, P.A.

(57) ABSTRACT

A mobile wireless communications device may include a wireless transceiver, a series of processing modules, a shared memory connected the plurality of processing modules and to the wireless transceiver, and a memory manager module for generating respective data location indices for data stored in the shared memory. The processing modules may cooperate with the shared memory and the memory manager module so that an upstream processing module stores given data in the shared memory, and so that a downstream processing module receives the data location index for the stored given data and processes the stored given data based thereon. The device may further include a security module for selectively purging data from the shared memory.

23 Claims, 5 Drawing Sheets

MOBILE WIRELESS COMMUNICATIONS DEVICE PROVIDING DATA MANAGEMENT AND SECURITY FEATURES AND RELATED METHODS

FIELD OF THE INVENTION

The present invention relates to the field of communications systems, and, more particularly, to data security in wireless communications devices and related methods.

BACKGROUND OF THE INVENTION

With advances in processing capabilities and programming technologies, software defined mobile wireless communications devices (e.g., radios) continue to increase in popularity. Rather than relying upon hardware and circuitry components to perform frequency, modulation, bandwidth, security, and/or waveform functions, these functions are instead performed by software modules or components in a software radio. That is, with a software radio analog signals are converted into the digital domain where the above-noted functions are performed using digital signal processing based upon software modules.

Because most of the functions of the radio are controlled by software, software radios may typically be implemented with relatively standard processor and hardware components. This may not only reduce device hardware costs, but it also provides greater flexibility in upgrading the device since new communications waveform modules can be uploaded to the device relatively easily and without the need to interchange new hardware components.

One particular class of software radios which takes advantage of the above-described advantages is the Joint Tactical Radio (JTR). The JTR includes relatively standard radio and processing hardware along with the appropriate waveform software modules for the communication waveforms the radio will utilize. JTRs also utilize operating system software that conforms with the Software Communications Architecture (SCA). The SCA is an open architecture framework that specifies how hardware and software components are to interoperate so that different manufacturers and developers can readily integrate their respective components into a single device.

Still another class of mobile wireless communications devices that increasingly use software components for communicating via different waveforms or standards is cellular communication devices. That is, many cellular devices are now designed to operate with more than one of the numerous cellular standards that are used throughout the world, such as the Global System for Mobile Communications (GSM) and Personal Communications Services (PCS), for example.

Despite the numerous advantages of software radios, one challenge presented by such devices is that of managing the flow of data through the radio where numerous processing modules are required to perform respective processing operations on the data. Various approaches have been developed for allowing processors or processing modules to interrelate and share data. One example is disclosed in U.S. Pat. No. 5,357,612 to Alaiwan. In this system, a plurality of processors are interconnected by a shared intelligent memory. Inter-task message passing is performed through the shared intelligent memory for storing messages transmitted by sending tasks. The system also allows elements to be purged from a queue in the shared memory using an index.

Despite the advantages of such systems, still further data management functionality may be desirable in mobile wireless communications devices. This may be particularly true where such devices communicate secure or classified data that may need to be purged from time-to-time to maintain data security.

SUMMARY OF THE INVENTION

In view of the foregoing background, it is therefore an object of the present invention to provide a mobile wireless communications device which provides enhanced data management and security features and related methods.

This and other objects, features, and advantages in accordance with the present invention are provided by a mobile wireless communications device which may include a wireless transceiver, a series of processing modules, a shared memory connected the plurality of processing modules and to the wireless transceiver, and a memory manager module for generating respective data location indices for data stored in the shared memory. The processing modules may cooperate with the shared memory and the memory manager module so that an upstream processing module stores given data in the shared memory, and so that a downstream processing module receives the data location index for the stored given data and processes the stored given data based thereon. The device may further include a security module for selectively purging data from the shared memory.

More particularly, the security module may selectively purge the data (e.g., all of the data in the shared memory) based upon a change in a security level of the data. The memory manager module may retain data for a predetermined time. That is, the memory manager module may retain the data a sufficient amount of time to allow one or more processors to perform their respective tasks before allowing the data to be overwritten or deleted. The memory manager module may also cause data to be stored within the shared memory based upon a balanced tree.

The mobile wireless communications device may further include an index memory for storing the data location indices. Thus, the indices may advantageously be stored separately from the data so that the indices are not erased when the security module purges the data, which could otherwise lead to processing errors, for example. The memory manager module may also allocate the shared memory among groups of data. By way of example, the processing modules may be selected from a group including a digital signal processing module, a voice/data processing module, a data validation module, and a cryptographic interface module.

The processing modules may operate in accordance with a Software Communications Architecture (SCA). In addition, the security module may be a secure cryptographic module, for example. The mobile wireless communications device may also include a portable housing carrying the wireless transceiver, the processing modules, the shared memory, the memory manager module, and the security module. An antenna may also be included and connected to the wireless transceiver.

A method aspect of the invention is for using a mobile wireless communications device, such as the one discussed briefly above. The method may include using an upstream processing module to store data in the shared memory, generating a data location index for the stored data, and using a downstream processing module to receive the data location index and process the stored data based upon the data location index. The method may further include selectively purging data from the shared memory. In addition, a computer-readable medium may similarly include the modules noted above.

The computer readable medium may further include shared memory or other storage mediums, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
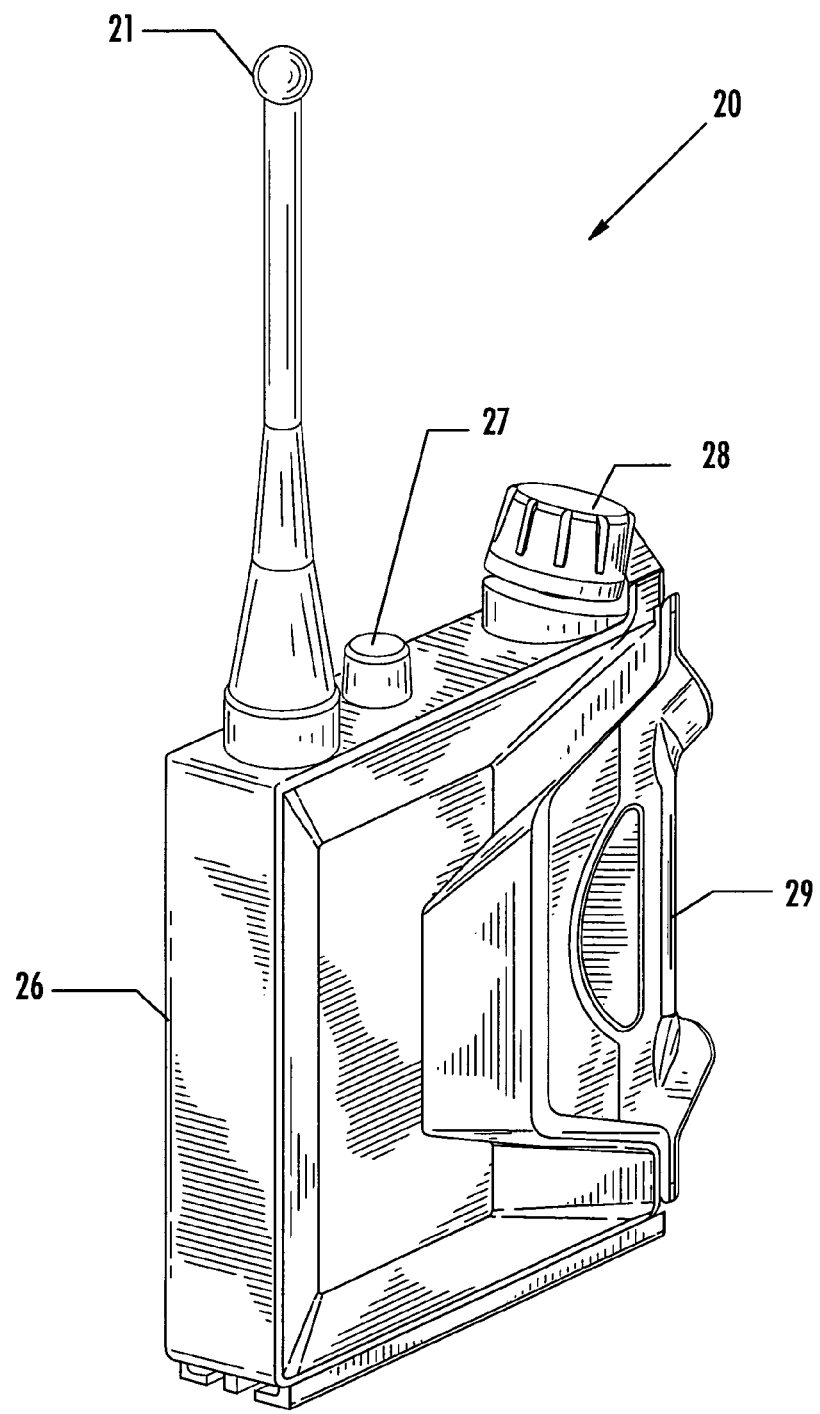
FIG. 1 is a perspective view of a wireless communications device in accordance with the present invention.
Figure 2:
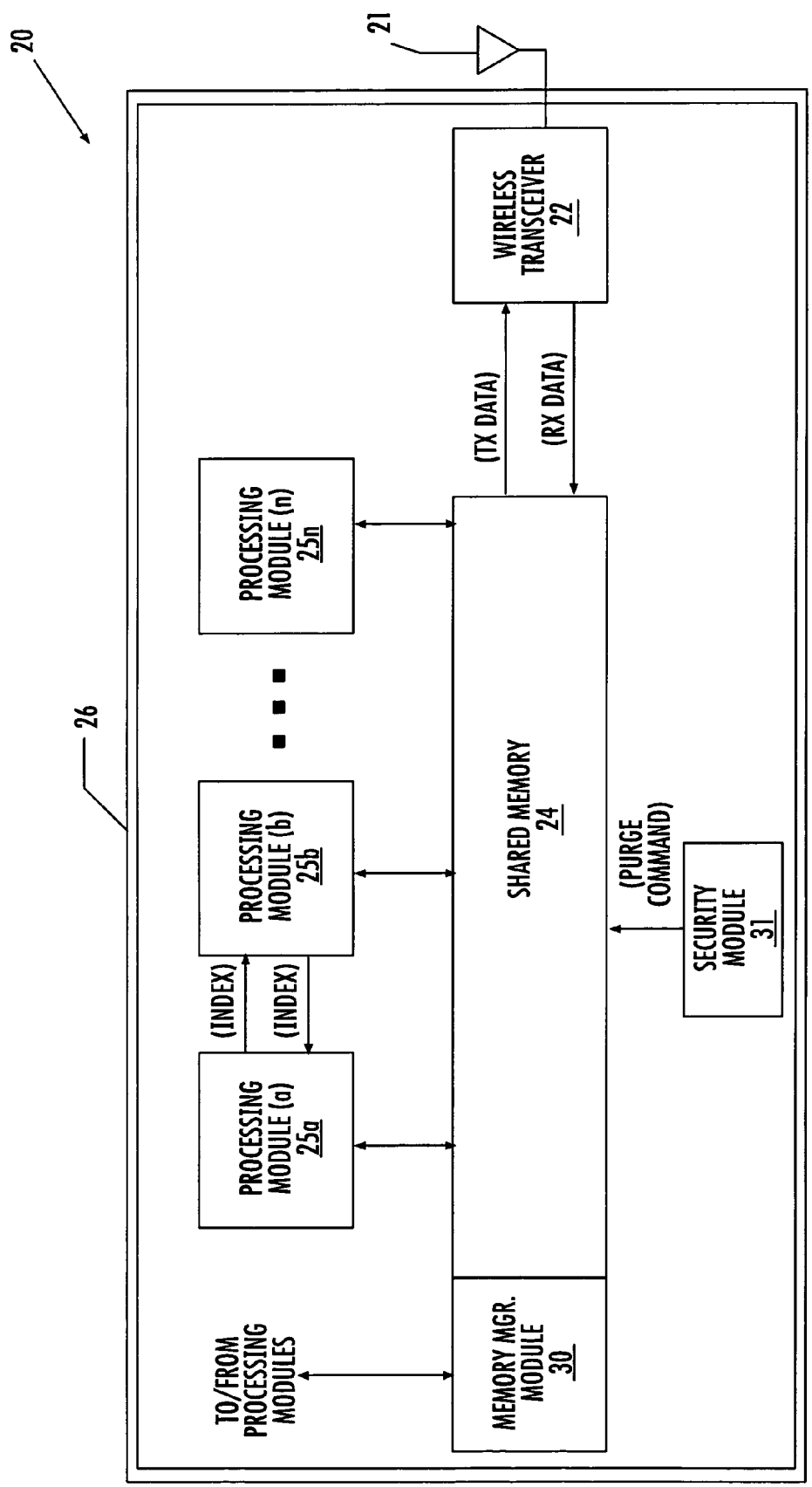
FIG. 2 is schematic block diagram of the mobile wireless communications device of FIG. 1.

Referring initially to FIGS. 1 and 2, a mobile wireless communications device 20 in accordance with the present invention is first described. By way of example, the device 20 may be a software defined Joint Tactical Radio (JTR) set for use with the JTR System (JTRS) that operates in accordance with the Software Communications Architecture (SCA), as will be appreciated by those skilled in the art. The mobile wireless communications device 20 will generally be described herein with respect to a JTR implementation. However, it will also be appreciated from the following description that the device 20 may be used in other applications as well, such as cellular communications and computer applications, for example.

The device 20 is preferably switchable between a plurality of wireless communications operating modes. In the case of a JTR, for example, such operating modes may include a Single-Channel Ground-Air Radio System (SINCGARS) mode, a HAVE QUICK mode, and a VULOS mode. Of course, the device 20 may be used with numerous other operating modes as well, as will be appreciated by those skilled in the art.

The device 20 illustratively includes an antenna 21 and a wireless transceiver 22 connected to the antenna and to a shared memory 24. The device 20 further illustratively includes a plurality of processing modules 25a-25n also connected to the shared memory 24. The device 20 also illustratively includes a memory manager module 30 for the shared memory 24, and a security module 31. By way of example, the above-noted modules may be implemented using one or more microprocessors and/or digital signal processors (DSPs) and corresponding software components for performing their respective tasks, which will be discussed further below. A portable housing 26 may carry the antenna 21, wireless transceiver 22, processing modules 25a-25n, shared memory 24, memory manager module 30, security module 24, as well as control knobs 27, 28 and a plug-in module 29.

Generally speaking, in the case of a mobile wireless communications device such as a JTR that is used for both secure (i.e., ciphertext) and unsecure (i.e., plaintext) communications, it is typically necessary to purge or "scrub" data, such as communication data packets, stored in the memory or buffers of the device from time-to-time. For example, when the device is switched from a plaintext mode to a ciphertext mode or vice-versa, it is typically desirable to purge all of the data current in memory so that secure and unsecure data packets are not intermingled. It may also be desirable to purge all data packets from memory upon detecting a security event, such as an intrusion alert, etc.

Some architectures such as the SCA require that processes or processing modules be able to exchange data amongst themselves for processing, and that each processing module manages it own buffer. However, data purging can become problematic as data is copied in and out of numerous buffers for different processing modules in a processing "pipeline." With data potentially resident in several processing buffers, it becomes difficult to ensure that all data is purged from every potential location where it might have been copied.

The processing modules 25a-25n advantageously use memory space within the same shared memory 24 for their respective buffers. This allows all stored data to be conveniently purged by erasing the contents of the entire shared memory 24 at once. That is, the security module 31 selectively purges data from the shared memory 24, such as upon the occurrence of a change in security level of the data (i.e., between ciphertext/classified data and plaintext/unclassified data) or a security event (intrusion detection, etc.), for example. Typically, the security module 31 will purge all of the data from the shared memory 24, but in some embodiments the security module could purge selected data from the shared memory, if desired.

The security module 31 initiates purges of the shared memory 24 independently of the current operations being performed by the processing modules 25a-25n. That is, the security module 31 purges the shared memory as soon as a security event or security level change occurs, even though the processing modules 25a-25n might be processing data at that time. Accordingly, if a data packet and a pointer thereto are purged while a processing module is attempting to process the data packet, the processing module may generate an error and potentially crash.

To avoid such a scenario while still using a shared memory scheme for ease of data purging, the memory manager module 30 advantageously allocates the shared memory 24 for storing different groups of data to be processed, and generates data location indices indicating the location of the data groups within the shared memory. It should be noted that in some embodiments respective buffer space could be allocated within the shared memory 24 for each of the processing modules 25a-25n, rather than allocating the shared memory by data groups.

The memory manager module 30 may also control the way in which data is stored in the shared memory 24. By way of example, the memory manager module 30 may cause data to be stored within the shared memory 24 based upon a self-balancing binary search tree (i.e., a "balanced tree") to advantageously reduce data access times, as will be appreciated by those skilled in the art. Of course, other suitable data storage techniques may also be used.

The processing modules 25a-25n cooperate with the shared memory 24 and the memory manager module 30 to perform data processing and storage in a manner that helps to avoid processing module crashes. Taking as an example data to be processed for transmission by the wireless transceiver 22, data will be sequentially processed by the processing modules 25a, 25b, . . . , 25n, in that order. As illustrated in FIG. 2, this order will be reversed for processing data received by the wireless transceiver 22. Thus, for transmission data, the processing modules 25a-25n cooperate with the shared memory 24 and the memory manager module 30 so that an upstream processing module (e.g., the processing module 25a) stores data in the shared memory 24. The next downstream processing module 25b receives the data location index associated with the given group of data and processes this group of data from the shared memory 24 based upon the index.

More particularly, when the upstream processing module 25a is done with its processing operations and is ready to "hand-off" the data to the downstream processing module 25b, only the data location index (i.e., a pointer) indicating the location of the given group of data is passed to the downstream processing module 25b, and the data itself remains in the buffer space of the shared memory 24 allocated by the memory manager module 30. The downstream processing module 25b may then process the given data from the location designated by the data location index and pass along the data location index to the next downstream processing module in the series of processing modules 25a-25n.

The memory manager module 30 preferably retains data in the shared memory 24 for a predetermined time. By way of example, a downstream processing modules 25 may have the option to indicate to the memory manager module 30 that is it accessing a given group of data, and that the buffer space allocated for the given group of data should not be returned to the usable buffer pool until the downstream processing module is finished with its processing operations. To this end, a reference count may be initiated by the memory manager module 30 which is incremented when a new processing module 25 is using the data, and decremented when that module is finished with its processing operations. When the reference count equals zero (i.e., after the predetermined count time or duration has expired), the buffer space is returned to the usable pool and the data therein may be overwritten.

Figure 3:
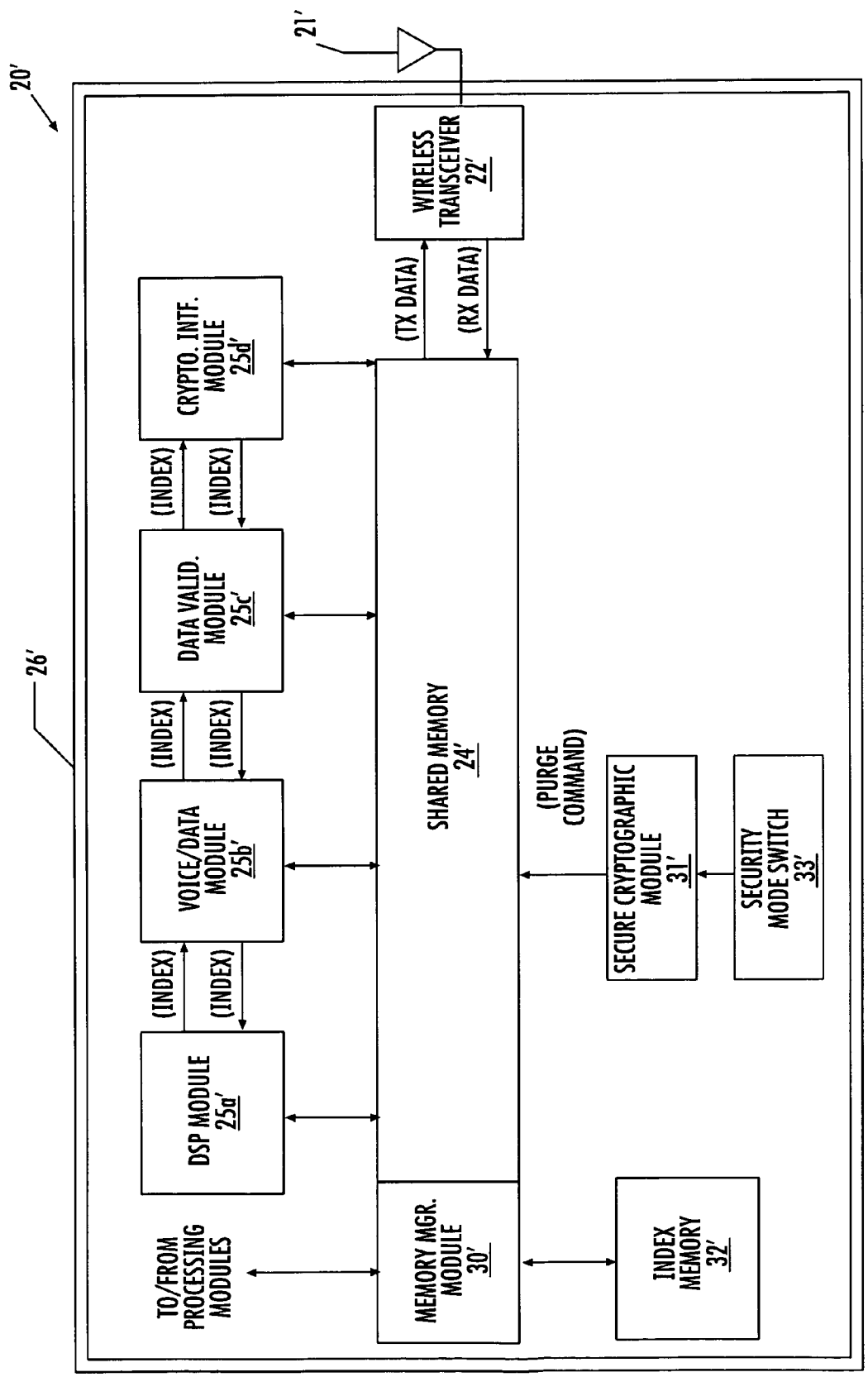
FIG. 3 is schematic block diagram of an alternative embodiment of the mobile wireless communications device the FIG. 1.

Turning now additionally to FIG. 3, an exemplary JTR implementation of a mobile wireless communications device 20' is now described. The device 20' illustratively includes an index memory 32' for storing the data location indices. This may be done so that the data location indices are not stored in the data buffer space of the shared memory 24' that is subject to purging. However, in some embodiments as separate index buffer space could be designated within the shared memory 24' that is not subject to purging. In this way, a "valid" index will always be available for a processing module 25' when requested, even if an intervening purge has occurred erasing the data that the index is actually pointing to. Thus, the processing module 25' will be directed to a location in the shared memory 24' which, although potentially having empty data values, will most likely not cause the processing module to crash as it might otherwise do if the data and its corresponding index were both deleted, as will be appreciated by those skilled in the art.

In the illustrated JTR example, the processing modules 25a'-25d' are a digital signal processing module, a voice/data processing module, a data validation module, and a cryptographic processing module, respectively. Among other functions, the DSP processing module 25a' may cooperate with the memory manager module 30' to allocate buffer space within the shared memory 24' for data traffic upon which digital signal processing operations have been or will be performed (e.g., encoding/decoding operations, etc.), and/or perform such DSP operations. The voice/data module 25b' may provide a state machine interface for DSP operations, as well as interact with the memory manager module 30' to free aborted traffic and return the buffer space associated therewith to the useable pool.

The data validation module 25c' may be responsible for validating data upon which cryptographic operations have been or will be performed (i.e., ciphertext). More specifically, the data validation module 25c' may allocate a bypass header from the memory manager module 30', as will be appreciated by those skilled in the art. In addition, the cryptographic interface module 25d' may function as a security traffic and bypass module which provides an interface to a secure cryptographic module 31' which performs the requisite cryptographic operations on the data and also controls purging of data from the shared memory 24', as discussed further below.

The cryptographic interface module 25d' may also cooperate with the memory manager module 30' to allocate buffer space within the shared memory 24' for cryptographic processing, and free memory as processing operations are completed. It should be noted that in some embodiments the functions of the secure cryptographic module 31' and the cryptographic interface module 25d' may be consolidated, even though these modules are shown separately in FIG. 3 for clarity of illustration.

The secure cryptographic module 31' may determine that the data security level is about to change based upon a security mode switch 33' operated by a user for example. Of course, a change in data security levels may be detected "automatically" in some embodiments based upon header information in received data packets, etc., as will also be appreciated by those skilled in the art.

Figure 4:
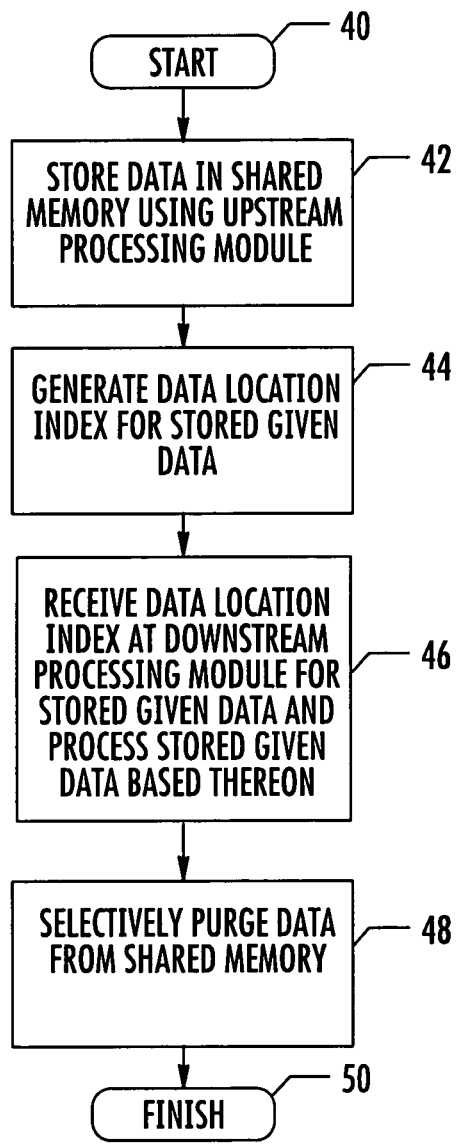
FIGS. 4 and 5 are flow charts illustrating method aspects of the present invention.

Turning additionally to FIG. 4, related method aspects for using a mobile wireless communications device 20 are now described. Beginning at Block 40, the method illustratively includes storing given data in a shared memory 24 using an upstream processing module 25a (Block 42), and generating a data location index for the stored given data, at Block 44. The method further illustratively includes using a downstream processing module 25b to receive the data location index and process the stored given data associated therewith, at Block 46.

As noted above, the security module 31 selectively purges data from the shared memory 24, at Block 48, thus concluding the illustrated method (Block 50). Again, this is done whenever a security level of the data changes, a security event is detected, etc. As such, the purging operation will occur independently of the above-described processing steps, and thus the step illustrated with respect to Block 48 could in fact occur at any time before or after the steps shown preceding the purging step with respect to Blocks 42, 44, and 46.

Figure 5:
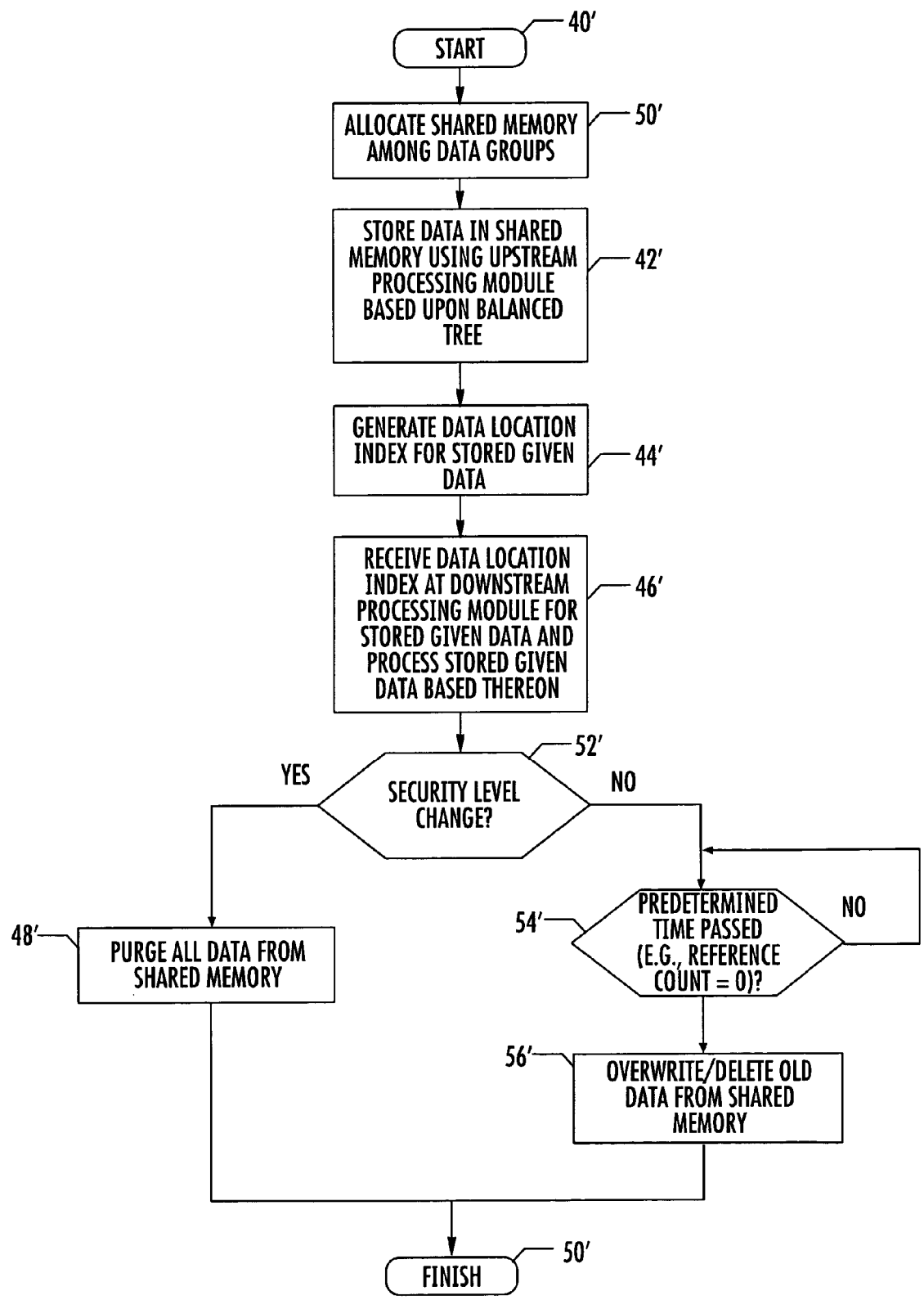

Additional method aspects will now be described with reference to FIG. 5. As noted above, the memory manager module 30 may allocate the shared memory 24 for different groups of data, at Block 50'. Also, the memory manager module 30 may cause the data to be stored in the shared memory 24 based upon a balanced tree, as also discussed above (Block 42'). Moreover, the security module 31 preferably purges all of the data from the shared memory 24 any time there is a change in security level of the data (or a security event is detected, etc.), at Blocks 48' and 52'. Additionally, the memory manager module 30 also preferably retains data in the shared memory 24 for a predetermined time, at Blocks 54', 56', to allow sufficient time for copying and/or processing by downstream processing modules 25, as discussed above.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
    a wireless transceiver;
    a series of processing modules;
    a shared memory connected to said processing modules and to said wireless transceiver;
    a memory manager module for generating data location indices for data stored in said shared memory;
    said processing modules cooperating with said shared memory and said memory manager module so that an upstream processing module stores given data in said shared memory and so that a downstream processing module receives the data location index for the stored given data and processes the stored given data based thereon; and
    a security module for selectively purging data from said shared memory based upon a change in an encryption level of the data.

2. The mobile wireless communications device of claim 1 wherein said security module selectively purges all of the data in said shared memory.

3. The mobile wireless communications device of claim 1 wherein said memory manager module retains data for a predetermined time.

4. The mobile wireless communications device of claim 1 wherein said memory manager module causes data to be stored within said shared memory based upon a balanced tree.

5. The mobile wireless communications device of claim 1 further comprising an index memory for storing the data location indices.

6. The mobile wireless communications device of claim 1 wherein said memory manager module further allocates said shared memory among groups of data.

7. The mobile wireless communications device of claim 1 wherein said processing modules operate in accordance with a Software Communications Architecture (SCA).

8. The mobile wireless communications device of claim 1 further comprising a portable housing carrying said wireless transceiver, said processing modules, said shared memory, said memory manager module, and said security module.

9. The mobile wireless communications device of claim 1 further comprising an antenna connected to said wireless transceiver.

10. The mobile wireless communications device of claim 1 wherein said processing modules are selected from a group comprising a digital signal processing module, a voice/data processing module, a data validation module, and a cryptographic interface module.

11. A mobile wireless communications device comprising:
    a wireless transceiver;
    a series of processing modules;
    a shared memory connected to said processing modules and to said wireless transceiver;
    a memory manager module for generating data location indices for data stored in said shared memory;
    said processing modules cooperating with said shared memory and said memory manager module so that an upstream processing module stores given data in said shared memory and so that a downstream processing module receives the data, location index for the stored given data and processes the stored, given data based thereon; and
    a secure cryptographic module for selectively purging data from said shared memory based upon a change in an encryption level of the data.

12. The mobile wireless communications device of claim 11 wherein said memory manager module retains data for a predetermined time.

13. The mobile wireless communications device of claim 11 wherein said memory manager module causes data to be stored within said shared memory based upon a balanced tree.

14. The mobile wireless communications device of claim 11 further comprising an index memory for storing the data location indices.

15. The mobile wireless communications device of claim 11 wherein said processing modules operate in accordance with a Software Communications Architecture (SCA).

16. A method for using a mobile wireless communications device comprising a wireless transceiver, a series of processing modules, and a shared memory connected to the processing modules and to the wireless transceiver, the method comprising:
    using an upstream processing module to store data in the shared memory;
    generating a data location index for the stored data;
    using a downstream processing module to receive the data location index and process the stored data based upon the data location index; and
    selectively purging data from the shared memory based upon a change in an encryption level of the data.

17. The method of claim 16 wherein data is stored within the shared memory based upon a balanced tree.

18. The method of claim 16 wherein the mobile wireless communications device further comprises an index memory; and further comprising storing the data location indices in the index memory.

19. The method of claim 16 wherein the processing modules operate in accordance with a Software Communications Architecture (SCA).

20. A non-transitory computer-readable medium for a wireless communications device comprising a shared memory and comprising:
    a series of processing modules;
    a memory manager module for generating data location indices for data stored in the shared memory;
    the processing modules cooperating with the shared memory and the memory manager module so that an upstream processing module stores given data in the shared memory and so that a downstream processing module receives the data location index for the stored given data and processes the stored given data based thereon; and
    a security module for selectively purging data from the shared memory based upon a change in an encryption level of the data.

21. The computer-readable medium of claim 20 wherein the memory manager module retains data for a predetermined time.

22. The computer-readable medium of claim 20 wherein the memory manager module causes data to be stored within the shared memory based upon a balanced tree.

23. The computer-readable medium of claim 20 wherein the processing modules operate in accordance with a Software Communications Architecture (SCA).

* * * * *